United States Patent [19]
Stenzel

[11] 4,056,388
[45] Nov. 1, 1977

[54] PROCESS FOR UTILIZING FERROPHOSPHORUS

[75] Inventor: Jürgen Stenzel, Erftstadt-Liblar, Germany

[73] Assignee: Hoechst Aktiengesellschaft, Frankfurt am Main, Germany

[21] Appl. No.: 690,678

[22] Filed: May 27, 1976

[30] Foreign Application Priority Data

May 31, 1975  Germany .............................. 2524259

[51] Int. Cl.$^2$ ...................... C22C 28/00; C01B 25/01
[52] U.S. Cl. .................................. 75/129; 75/134 S; 423/322
[58] Field of Search ...................... 75/132, 129, 134 S; 423/322

[56] References Cited

U.S. PATENT DOCUMENTS

| | | | |
|---|---|---|---|
| 1,751,783 | 3/1930 | White | 75/132 |
| 3,699,213 | 10/1972 | Cosman | 75/132 |

FOREIGN PATENT DOCUMENTS

| | | | |
|---|---|---|---|
| 1,193,061 | 5/1970 | United Kingdom | 75/132 |

*Primary Examiner*—P. D. Rosenberg
*Attorney, Agent, or Firm*—Connolly and Hutz

[57] ABSTRACT

Ferrophosphorus is utilized. To this end, a melt of ferrophosphorus is reacted with a melt of calcium silicide so as to obtain ferrosilicon and calcium phosphide.

2 Claims, No Drawings

PROCESS FOR UTILIZING FERROPHOSPHORUS

The present invention relates to the utilization of ferrophosphorus.

In the electrothermal production of elementary phosphorus, relatively large quantities of ferrophosphorus are invariably obtained. Ferrohosphorus finds, however, limited use only, e.g. as an alloying agent in the steel industries, as a deoxidant or for making protective walls for nuclear reactors. Irrespective of such uses, it should be borne in mind that the ferrophosphorus constituents taken as a whole are substantially more valuable than ferrophosphorus itself.

It has already been proposed (cf. French Pat. No. 683 609) to subject ferrophosphorus to distillation at high temperatures and under reduced pressure in an attempt to recover especially the phosphorus contained in it.

Attempts have also been made to react ferrophosphorus with substances which are capable of converting the phosphorus to hydrolytically decomposable phosphides.

More particularly, ferrophosphorus has been reacted with alkaline earth metals or aluminum with the resultant formation of corresponding phosphides (cf. R. Vogel and H. Klose, Archiv fuer Eisenhuettenwesen 23 (1957), 287).

The processes used heretofore are, however, not fully satisfactory in respect of the following points:

1. In order to substantially completely combine the phosphorus with aluminum, it is necessary for the aluminum to be used in a quantity three times greater than the theoretical.
2. The resulting aluminum phosphide fails to be separated from the iron/aluminum-alloy. It rather forms an intimate mixture with the iron/aluminum-alloy.

The present invention now unexpectedly provides a process permitting ferrophosphorus to be utilized in simple manner, which comprises reacting the ferrophosphorus with a calcium silicide melt and thereby converting it to ferrosilicon and calcium phosphide.

It is advantageous for the reaction to be affected at preferred temperatures of 1250° C up to 1500° C.

Following this, the resulting melt should conveniently be allowed to gradually cool, and the resulting two solid phases comprised of ferrosilicon and calcium phosphide, respectively, should be separated from one another.

A particularly preferred feature of the present process comprises reacting the ferrophosphorus with calcium silicide in the proportions necessary to obtain a reaction mixture containing calcium and phosphorus in at least the stoichiometric quantities necessary for the formation of calcium phosphide $Ca_3P_2$.

It is also advantageous to use calcium silicide containing at least 50 weight % of silicon.

More particularly, calcium phosphide is obtained substantially quantitatively in all those cases in which ferrophosphorus and calcium silicide are used in the stoichiometric proportions necessary for the formation of $Ca_3P_2$, based on phosphorus and calcium.

It is possible in this manner to obtain ferrosilicon which contains less than 1 weight % of phosphorus, i.e. which is practically free from phosphorus.

This would not have been expected, even by the expert, in view of the findings reported by R. Vogel and H. Klose (Archiv fuer Eisenhuettenwesen 27 (1956) 15–6) on reactions of ferrophosphorus-alloys with metallic calcium. Following the teachings of this article, it is absolutely necessary for the calcium to be reacted with an iron/phosphorus-alloy containing more than 15 weight % of phosphorus so as to obtain calcium phosphide together with an iron alloy containing 15 weight % of phosphorus.

In clear contrast with this, we have found that the overall quantity of phosphorus in an iron/phosphorusalloy can be converted to calcium phosphide by reacting the alloy with calcium silicide.

If the Si-content in the metal phase of the Fe-P-Ca-Si-system falls below 35 weight %, phosphorus is less completely combined with calcium, and the phosphorus content in the metal phase increases to more than 1 %. In other words, the phosphorus concentration in the metal increases as the silicon content decreases in the metal phase.

The calcium phosphide of the present invention reacts vigorously with water with the resultant formation of phosphine and calcium hydroxide in quantitative yields. The phosphine is free from diphosphine and not likely to undergo self-ignition in contact with air.

EXAMPLE 1

486 g of calcium silicide (30.9 weight % of Ca, 61.5 weight % of Si, 6 weight % of Fe) was converted to a melt in a Tamman furnace in a graphite crucible at 1350° C, and 300 g of lump ferrophosphorus (25.9 weight % of P, 66.8 weight % of Fe, 3.7 weight % of Si) was added. At 1450° C, the whole was in the form of a melt which was stirred for 1 minute with a graphite rod. The mass was highly fluid. It was allowed to cool down to 1100° C (temperature drop: 100° C/5 min). The mass was found to solidify with phase separation. It was allowed to further cool down to room temperature, and the button was taken from the crucible. Two blocks easy to separate mechanically were detected by visual inspection, namely 478 g of a metal block composed of:

| | |
|---|---|
| 44.1 | wgt % of Fe |
| 0.37 | wgt % of P |
| 47.1 | wgt % of Si |
| 2.6 | wgt % of Ca |
| 1.07 | wgt % of Ti |
| 95.24 | wgt % | and
308 g of a phosphide block composed of:

| | |
|---|---|
| 6.2 | wgt % of Fe |
| 27.4 | wgt % of P |
| 16.5 | wgt % of Si |
| 45.1 | wgt % of Ca |
| 0.1 | wgt % of Ti |
| 95.3 | wgt % |

EXAMPLE 2

437 g of calcium silicide (30.9 weight % of Ca, 61.5 weight % of Si, 6 weight % of Fe) was converted to a melt in a Tamman furnace in a graphite crucible at 1350° C, and 250 g of ferrophosphorus (25.9 weight % of P, 66.8 weight % of Fe, and 3.7 weight % of Si) was added. The temperature was increased to 1450° C, the resulting mass was stirred with a graphite rod and then allowed to gradually cool (temperature drop: 100° C/5 minutes). The whole was allowed to further cool down to room temperature and the button was taken from the crucible. The lower block of metallic luster weighed 446 g. Placed thereabove was a slag-like layer which tenaciously adhered to the graphite crucible. It weighed 237 g. On crushing, it became reddish shot-colored.

The metal block was composed of:

| | |
|---|---|
| 44.6 | wgt % of Fe |
| 0.16 | wgt % of P |
| 47.0 | wgt % of Si |
| 2.1 | wgt % of Ca |
| 1.04 | wgt % of Ti |
| 94.9 | wgt % | and
the phosphide block was composed of:

| | |
|---|---|
| 3.09 | wgt % of Fe |
| 26.5 | wgt % of P |
| 19.1 | wgt % of Si |
| 47.6 | wgt % of Ca |
| 0.1 | wgt % of Ti |
| 95.2 | wgt % |

EXAMPLE 3

438 g of calcium silicide (30.9 wgt % of Ca, 61.5 wgt % of Si, 6 wgt % of Fe) was converted in a melt in a graphite crucible at 1350° C under nitrogen, and 300 g of ferrophosphorus (25.9 wgt % of P, 66.8 wgt % of Fe, and 3.7 wgt % of Si) was added. The temperature was increased to 1450° C and the whole was stirred with a graphite rod. Following this, the mass was allowed to gradually cool (temperature drop: 100° C/5 minutes) with phase separation. The cooled reaction product was taken from the crucible. The specifically more dense metal block weighed 492 g and the solidified phosphide layer thereabove weighed 241 g.

The metal block was composed of:

| | |
|---|---|
| 46.5 | wgt % of Fe |
| 0.95 | wgt % of P |
| 40.6 | wgt % of Si |
| 2.4 | wgt % of Ca |
| 1.3 | wgt % of Ti |
| 91.75 | wgt % | and
the phosphide block was composed of:

| | |
|---|---|
| 1.4 | wgt % of Fe |
| 27.8 | wgt % of P |
| 15.1 | wgt % of Si |
| 51.2 | wgt % of Ca |
| 0.2 | wgt % of Ti |
| 95.7 | wgt % |

EXAMPLE 4

201 g of calcium silicide (54.6 wgt % of Ca, 33.5 weight % of Si, 3.6 wgt % of Fe, and 1.1 wgt % of Al), which was produced by melting commercially available calcium silicide and calcium metal in an aluminum oxide crucible, was converted into a melt in a graphite crucible at 1350° C under nitrogen, and 220 g of ferrophosphorus (25.9 wgt % of P, 66.8 wgt % of Fe, and 3.7 wgt % of Si) was added. The temperature was increased to 1450° C and the resulting melt was stirred with a graphite rod. The whole was allowed to gradually cool (temperature drop: 100° C/5 minutes) and to solidify. Two sharply separated phases were obtained. The whole was allowed to further cool and the reaction product was taken from the crucible. The specifically more dense metal block weighed 238 g. The phosphide layer thereabove capable of wetting graphite weighed 170 g.

The metal block was composed of:

| | |
|---|---|
| 66.0 | wgt % of Fe |
| 1.5 | wgt % of P |
| 27.4 | wgt % of Si |
| 0.2 | wgt % of Ca |
| 1.0 | wgt % of Ti |
| 96.1 | wgt % | and
the phosphide block was composed of:

| | |
|---|---|
| 1.2 | wgt % of Fe |
| 28.2 | wgt % of P |
| 5.9 | wgt % of Si |
| 59.4 | wgt % of Ca |
| 94.7 | wgt % |

EXAMPLE 5

245 g of ferrophosphorus (25.9 wgt % of P, 66.8 wgt % of Fe, and 3.7 wgt % of Si) was converted into a melt in a Tamman furnace in a graphite crucible at 1450° C, and 157 g of calcium silicide (72.2 wgt % of Ca, 21.1 wgt % of Si, 2.0 wgt % of Fe, and 1.1 wgt % of Al), which was prepared by melting commercially available calcium silicide with calcium in an aluminum oxide crucible, was added portionwise under argon to the ferrophosphorus melt. The reaction was accompanied by the phenomenon of inflammation. The last portions reacted considerably less vigorously. After all had been added, the melt was stirred with a graphite rod and allowed to gradually cool. The reaction product was obtained in the form of two sharply separated phases which were taken from the crucible. The metal block weighed 216 g and the phosphide block weighed 186 g.

The metal block was composed of:

| | |
|---|---|
| 76.4 | wgt % of Fe |
| 5.8 | wgt % of P |
| 14.7 | wgt % of Si |
| 0.4 | wgt % of Ca |
| 97.3 | wgt % | and
the phosphide block was composed of:

| | |
|---|---|
| 1.4 | wgt % of Fe |
| 25.6 | wgt % of P |
| 2.4 | wgt % of Si |
| 66.6 | wgt % of Ca |
| 96.0 | wgt % |

EXAMPLE 6

85 g of the phosphide block of Example 1 was placed in a 1 liter round-necked flask provided with a dropping funnel, stirrer and reflux condenser, and decomposed therein by means of water which was added dropwise. The block underwent decomposition into phosphine, calcium hydroxide and silicic acid while heat was set free. 16.5 normal liter (S.T.P) of gaseous matter composed of 95 % by volume of $PH_3$, 4.5 % by volume of $H_2$ and 0.5 % by volume of Na was collected. The gas could not be found to be ignited in contact with air.

I claim:

1. A process for utilizing ferrophosphorus for the production of calcium phosphide, which comprises reacting ferrophosphorus with calcium silicide in proportions necessary to obtain a reaction mixture containing calcium and phosphorus in at least the stoichiometric quantities necessary for the formation of calcium phosphide $Ca_3P_2$ at temperatures of 1250° C up to 1500° C, allowing the resulting melt to gradually cool with the resultant formation of two separate phases consisting of ferrosilicon and calcium phosphide, respectively, and separating the said phases from one another.

2. The process as claimed in claim 1, wherein the calcium silicide used contains at least 50 weight % of silicon.